United States Patent
Pesola et al.

(10) Patent No.: US 9,787,621 B2
(45) Date of Patent: Oct. 10, 2017

(54) TRIGGER EVENT BASED RESPONSE EXECUTION WITH SECURE INITIALIZATION

(71) Applicant: The Button Corporation Oy, Helsinki (FI)

(72) Inventors: Juuso Pesola, Helsinki (FI); Jari Leminen, Helsinki (FI); Sami Pönkänen, Helsinki (FI); Harri Rautio, Helsinki (FI); Erkki Heilakka, Helsinki (FI)

(73) Assignee: The Button Corporation Oy, Helsinki (FI)

( * ) Notice: Subject to any disclaimer, the term of this patent is extended or adjusted under 35 U.S.C. 154(b) by 168 days.

(21) Appl. No.: 14/278,669

(22) Filed: May 15, 2014

(65) Prior Publication Data

US 2015/0334187 A1 Nov. 19, 2015

(51) Int. Cl.
*H04L 29/06* (2006.01)
*G06F 21/00* (2013.01)
(Continued)

(52) U.S. Cl.
CPC ............ *H04L 51/18* (2013.01); *G06F 3/0484* (2013.01); *G06F 3/04842* (2013.01);
(Continued)

(58) Field of Classification Search
CPC ..... H04L 67/125; H04L 51/02; H04L 51/046; H04L 67/10; H04W 8/20; H04W 4/005; G06F 3/04842
See application file for complete search history.

(56) References Cited

U.S. PATENT DOCUMENTS

2006/0031457 A1  2/2006  Motoyama
2008/0137828 A1  6/2008  Chmaytelli
(Continued)

FOREIGN PATENT DOCUMENTS

EP      2458407 A1      5/2012
WO   2013/190402 A1   12/2013
WO   WO 2016103047 A1 *  6/2016  ............ H04W 4/008

OTHER PUBLICATIONS

Janet Light, Deepika David; "An efficient security algorithm in mobile computing for resource constrained mobile devices"; Oct. 2008; Q2SWinet '08: Proceedings of the 4th ACM symposium on QoS and security for wireless and mobile networks; Publisher: ACM; pp. 113-114.*

(Continued)

*Primary Examiner* — Kambiz Zand
*Assistant Examiner* — Courtney Fields
(74) *Attorney, Agent, or Firm* — Ziegler IP Law Group, LLC

(57) ABSTRACT

An identification message is sent from a sensor apparatus, over a wireless communication network, in response to a trigger event sensed by a sensor device in the sensor apparatus. The identification message includes a unique identifier of the sensor apparatus. The identification message is received at a network server. A pre-configured action profile associated with the unique identifier in the received identification message is accessed by the network server. A response action is caused to be executed based on information in the accessed action profile. The sensor apparatus is paired to a subscriber account before first use, thereby allowing secure initialization.

12 Claims, 3 Drawing Sheets

(51) Int. Cl.
  *H04L 12/58* (2006.01)
  *H04L 29/08* (2006.01)
  *H04W 4/00* (2009.01)
  *H04W 8/20* (2009.01)
  *G06F 3/0484* (2013.01)
  *H04W 76/02* (2009.01)
  *H04W 84/18* (2009.01)
  *H04W 12/06* (2009.01)
  *G06F 3/0488* (2013.01)
  *G06F 3/01* (2006.01)

(52) U.S. Cl.
  CPC ............ *H04L 51/02* (2013.01); *H04L 51/046* (2013.01); *H04L 67/10* (2013.01); *H04L 67/125* (2013.01); *H04W 4/005* (2013.01); *H04W 8/20* (2013.01); *G06F 3/016* (2013.01); *G06F 3/0488* (2013.01)

(56) References Cited

U.S. PATENT DOCUMENTS

| | | | | |
|---|---|---|---|---|
| 2009/0167524 A1* | 7/2009 | Chesnutt | ............... | G08C 17/02 340/539.19 |
| 2009/0279682 A1* | 11/2009 | Strandell | ............... | H04L 63/18 379/201.02 |
| 2009/0292416 A1* | 11/2009 | Ubik | ............... | H04W 24/00 701/32.8 |
| 2011/0159895 A1 | 6/2011 | Arzelier et al. | | |
| 2011/0195699 A1* | 8/2011 | Tadayon | ............. | H04B 5/0062 455/418 |
| 2012/0158161 A1* | 6/2012 | Cohn | ............... | H04L 12/2827 700/90 |

OTHER PUBLICATIONS

"Opticam Outdoor FI8903W Tele wireless IP camera", Datasheet, Verkkokauppa.com, retrived on Aug. 12, 2015, 3 pages including 1 page of English translation. Available at: http://web.archive.org/web/20120829233641/http://www.verkkokauppa.com/fi/product/36431/cdmrh/Opticam-Outdoor-FI8903W-TELE-langaton-verkkovalvontakamera.

International Search Report received for International Patent Application No. PCT/FI2015/050333, dated Aug. 17, 2015, 5 pages.

* cited by examiner

TRIGGER EVENT BASED RESPONSE EXECUTION WITH SECURE INITIALIZATION

BACKGROUND

Field

The aspects of the present disclosure relate to data communications. In particular, the aspects of the present disclosure relate to trigger event based response execution with secure initialization.

Description of the Related Art

Various Internet and mobile telecommunications related services have proliferated during the last decade.

While there have been efforts to simplify using these services, they still typically require several actions from the end-user and/or complex set-up operations.

Accordingly, to the aspects of the present disclosure advantageously alleviate the problems described above and to introduce a solution that allows an extremely simple way to interact with e.g. various Internet and mobile telecommunications related services, for example by a single button press, and that allows secure initialization.

SUMMARY

A first aspect of the present disclosure is a system that comprises a sensor apparatus that is configured to send an identification message over a wireless communication network in response to a trigger event sensed by a sensor device comprised in the sensor apparatus. The identification message consists of a unique identifier of the sensor apparatus. The system further comprises a network server that is configured to receive the identification message, access a pre-configured action profile associated with the unique identifier in the received identification message, and cause a response action to be executed based on information in the accessed action profile. The sensor apparatus is further configured to be paired to a subscriber account before first use.

A second aspect of the present disclosure is a method in which an identification message is sent from a sensor apparatus, over a wireless communication network, in response to a trigger event sensed by a sensor device comprised in the sensor apparatus. The identification message consists of a unique identifier of the sensor apparatus. The identification message is received at a network server. A pre-configured action profile associated with the unique identifier in the received identification message is accessed by the network server. The network server causes a response action to be executed based on information in the accessed action profile. The method further comprises pairing the sensor apparatus to a subscriber account before first use.

A third aspect of the present disclosure is a sensor apparatus that comprises a sensor device configured to sense a trigger event. The sensor apparatus further comprises a wireless transmitter configured to send an identification message over a wireless communication network to a network server in response to the trigger event sensed by sensor device. The identification message consists of a unique identifier of the sensor apparatus. The sensor apparatus is further configured to be paired to a subscriber account before first use.

In an embodiment of the present disclosure, the response action comprises a database transaction.

In an embodiment of the present disclosure, the response action comprises generating an action message based on information in the accessed action profile, and sending the generated action message to a network node based on the information in the accessed action profile.

In an embodiment of the present disclosure, the pairing comprises entering to subscriber account associated data a unique device code associated with the sensor apparatus.

In an embodiment of the present disclosure, the pairing further comprises entering to subscriber account associated data a description of a light signal sequence displayed by the sensor apparatus.

In an embodiment of the present disclosure, the sensor device is semiconductor based, and the sensed trigger event comprises a trigger event measurable with a semiconductor based sensor device.

In an embodiment of the present disclosure, the sensed trigger event relates to at least one of: touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, and motion in proximity of the sensor apparatus.

In an embodiment of the present disclosure, the sensor apparatus comprises a button, and the trigger event consists of touching and pressing the button.

In an embodiment of the present disclosure, the sensor apparatus comprises one of a computing device with a touch screen and a computing device with a non-touch screen; and the trigger event consists of one of touching an object drawn on the touch screen and clicking an object drawn on the non-touch screen, respectively.

In an embodiment of the present disclosure, the information in the action profile comprises recipient data, content of the action message, and a type of the action message.

It is to be understood that the aspects and embodiments of the present disclosure described above may be used in any combination with each other. Several of the aspects and embodiments may be combined together to form a further embodiment of the invention. A system, a method, or a sensor apparatus which is an aspect of the invention may comprise at least one of the embodiments of the invention described above.

The aspects of the present disclosure allows an extremely simple and inexpensive way to interact with e.g. various Internet and mobile telecommunications related services, for example by a single button press. The aspects of the present further allow secure initialization of the sensor apparatus.

BRIEF DESCRIPTION OF THE DRAWINGS

The accompanying drawings, which are included to provide a further understanding of the present disclosure and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
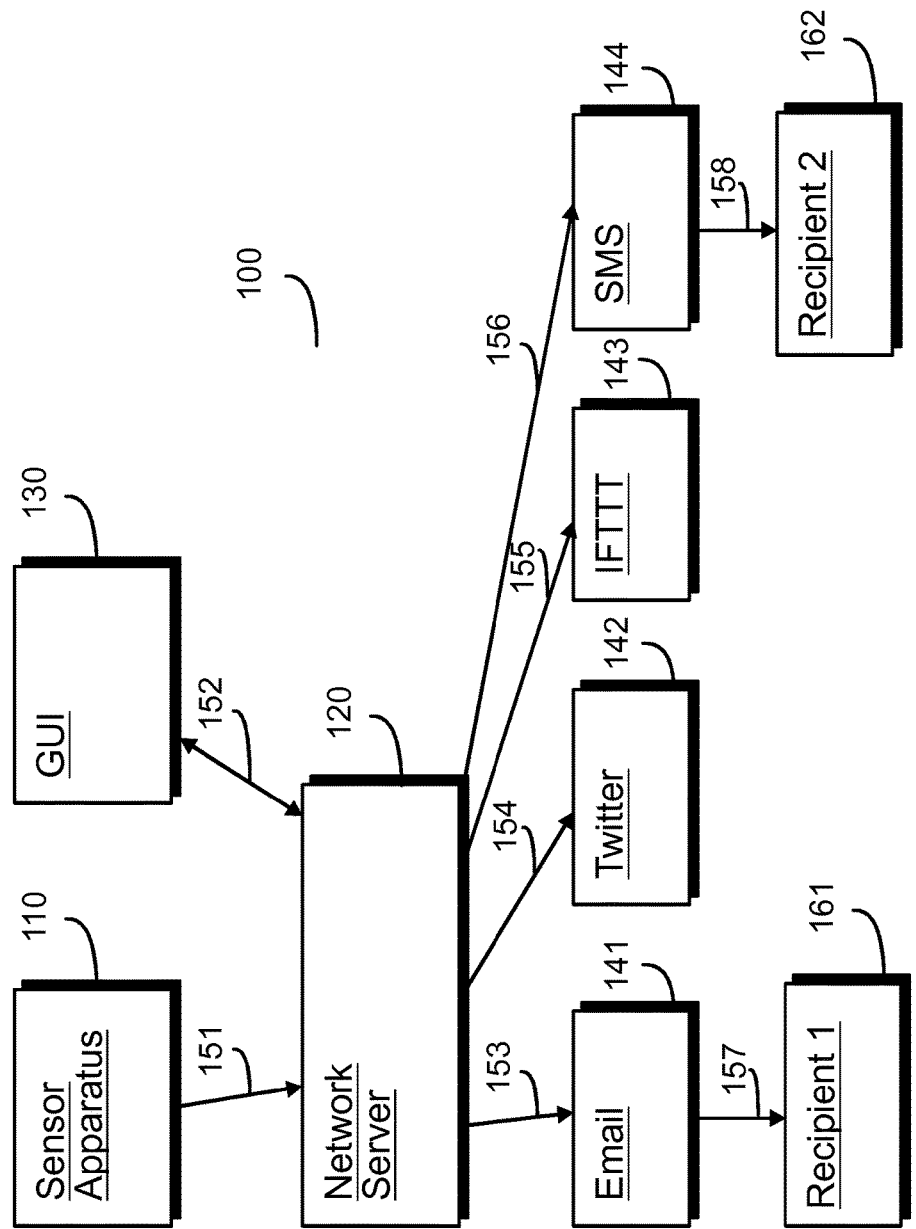
FIG. 1 is a block diagram illustrating a system according to an embodiment of the present disclosure.

FIG. 1 is a block diagram illustrating a system 100 according to an embodiment of the present disclosure. The system 100 comprises a sensor apparatus 110 that is configured to send an identification message over a wireless communication network in response to a trigger event sensed by a sensor device comprised in the sensor apparatus. As shown in more detail in FIG. 3a, the sensor apparatus 110 may comprise a sensor device 111 that is configured to sense a trigger event. Furthermore, the sensor apparatus 110 may comprise a wireless transmitter 112 that is configured to send an identification message over a wireless communication network to a network server 120 in response to the trigger event sensed by sensor device 111.

Furthermore, the sensor apparatus 110 may comprise a feedback unit 114 that is configured to receive a feedback message, and to provide a feedback signal in response to the received feedback message. The feedback signal may comprise e.g. a light signal and/or a sound signal. The feedback message may be sent e.g. by the network node 141-144 receiving the action message or the recipient 161-162. The feedback message may be transmitted to the sensor apparatus 110 via the network server 120 or directly to the sensor apparatus 110. For example, in case of a request for a taxi/cab, the taxi center may send a feedback message indicating successful receipt of the request, and the sensor apparatus 110 may then provide e.g. a predetermined light and/or sound signal indicating successful receipt of the request to the person(s) who sent the request.

The sensor apparatus 110 is further configured to be paired to a subscriber account before first use. The pairing may comprise entering to subscriber account associated data a unique device code associated with the sensor apparatus 110. The pairing may further comprise entering to subscriber account associated data a description of a light signal sequence displayed by the sensor apparatus 110. The sensor apparatus 110 may utilize e.g. the feedback unit 114 for displaying the light signal sequence. The pairing allows secure initialization of the sensor apparatus 110.

The identification message consists of a unique identifier of the sensor apparatus 110. The unique identifier may be e.g. a string of alphanumeric characters. The sensor device 111 may be semiconductor based, and the trigger event may comprise a trigger event that can be measured with a semiconductor based sensor device. For example, trigger event may relate to at least one of: touching the sensor apparatus 110, illumination in proximity of the sensor apparatus 110, temperature in proximity of the sensor apparatus 110, position of the sensor apparatus 110, acceleration of the sensor apparatus 110, compass heading of the sensor apparatus 110, velocity of the sensor apparatus 110, and motion in proximity of the sensor apparatus 110.

Figure 3B:
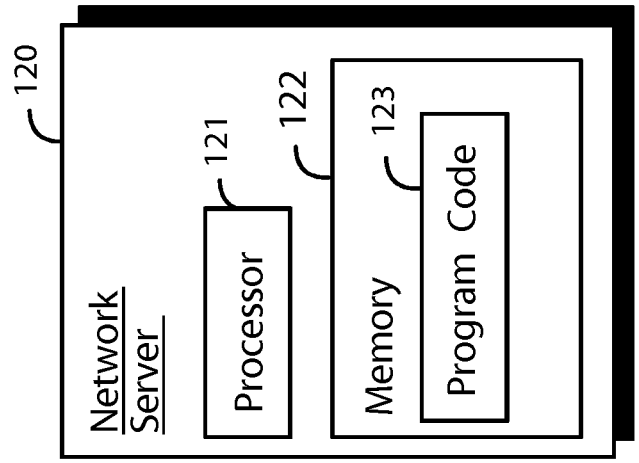
FIGS. 3a-3b are block diagrams illustrating apparatuses according to an embodiment of the present disclosure.
Figure 3A:
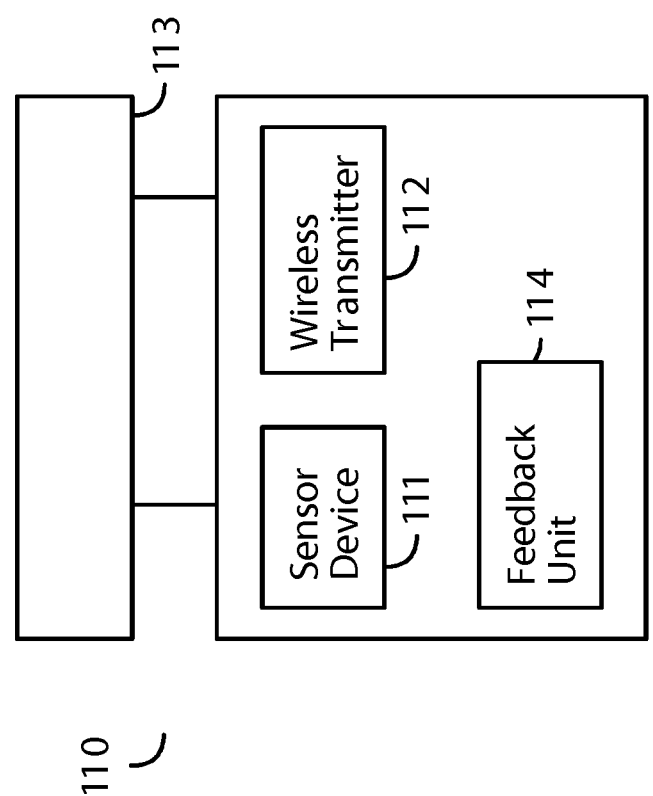

As also shown in FIG. 3a, the sensor apparatus 110 may comprise a button 113. In this case, the trigger event may consist of pressing the button 113. Further in this case, the sensor device 111 may comprise e.g. a switch arrangement responsive to the button 113.

Alternatively, the sensor apparatus 110 may comprise a computing device (e.g. a smart phone or a tablet computer) with a touch screen. In this case, the trigger event may consist of touching an object drawn on the touch screen. In yet another embodiment, the sensor apparatus 110 may comprise a computing device (e.g. a laptop computer or a desktop computer) with a non-touch screen. In this case, the trigger event may consist of clicking, e.g. with a mouse, an object drawn on the non-touch screen.

The system 100 further comprises a network server 120 that is configured to receive the identification message, access a pre-configured action profile, i.e. a data set, associated with the unique identifier in the received identification message, and cause a response action to be executed based on information in the accessed action profile.

The response action may comprise a database transaction. Alternatively/additionally, the response action may comprise generating an action message based on information in the accessed action profile, and sending the generated action message to a network node 141, 142, 143 and/or 144 based on the information in the accessed action profile.

As shown in more detail in FIG. 3b, the network server 120 may comprise at least one processor 121 and at least one memory 122 including computer program code 123. The at least one memory 122 and the computer program code 123 are configured to, with the at least one processor 121, cause the network server 120 at least to perform:

receiving the identification message sent by the sensor apparatus 110 over a wireless communication network in response to a trigger event sensed by the sensor device 111 comprised in the sensor apparatus 110, the identification message consisting of a unique identifier of the sensor apparatus 120;

accessing a pre-configured action profile associated with the unique identifier in the received identification message; and causing a response action to be executed based on information in the accessed action profile.

The action message may be in the form of a text messaging service message, an electronic mail message, or a hypertext transfer protocol-based message. Examples of the text messaging service message include short message service (SMS) messages and multimedia messaging service (MMS) messages. Examples of the hypertext transfer protocol-based message include Facebook posts, Twitter tweets, and a http-request to a given system.

Content wise, the action message may comprise at least one of a service request, an emergency call, a toggle request, and a counter notification. Examples of the service request include a request for a taxi/cab (e.g. an SMS to a taxi center), a request for a delivery pick-up (e.g. an SMS to a logistics company ordering system), and a pizza order (e.g. an SMS to a pizzeria). Examples of the emergency call include a help request from an elderly person (e.g. an SMS to a relative or a caretaker or a nurse). Examples of the toggle request include a request to switch a car heater on/off, a request to switch car lights on/off, a request to switch a locking system on/off, a request to switch sauna heating on/off, and IFTTT (www.ifttt.com)-related messages used to switch a given event on/off. Examples of the counter notification include a customer counter at a shop or a visitor counter at a sightseeing attraction, e.g. visitors may press the button 113 to register their visit and the operator of the sightseeing attraction may then use the accumulated visitor counter data for reports, statistics, etc.

Furthermore, the information in the action profile may define the response action to be executed based on at least one of frequency, amount and lack of received identification messages. Alternatively/additionally, the network server 120 may be further configured to receive one or more feedback messages, and the information in the action profile may define the response action to be executed based on at least one of frequency, amount and lack of received feedback messages. For example, the information in the action profile may include definitions for use in case the button 113 is not pressed by a predefined time or within a predefined time period. Alternatively/additionally, the information in the action profile may include definitions for use in case a recipient and/or a network node does not send a feedback message. In such a case, the action profile may e.g. define an alternative recipient for a re-transmission. Alternatively/additionally, the information in the action profile may include definitions for use in case a predefined amount of identification messages has been received. For example, the response action may be caused to be executed only after the predefined amount of identification messages has been received. Alternatively/additionally, the information in the action profile may include definitions for use in case a predefined amount of feedback messages has been received. Alternatively/additionally, the information in the action profile may include definitions for use in case feedback messages have been received from a predefined amount of recipients/network nodes (e.g. in a voting application).

The system 100 may further comprise one or more network nodes 141, 142, 143 or 144 which are configured to receive the generated action message, and in case a request is included in the received action message, to comply with the request. Examples of the network nodes include an email server 141, a Twitter related network node 142, such as a server, an IFTTT related network node 143, such as a server, and a short message service center (SMSC).

The system 100 may further comprise a graphic user interface 130 that is configured to enable editing of the information in the action profile. The graphic user interface 130 may be accessed e.g. via an internet browser (running e.g. on a laptop computer or a desktop computer) and/or a mobile device application (running e.g. on a smart phone or a tablet computer). The information in the action profile may comprise e.g. recipient data, content of the action message, and a type of the action message. The information in the action profile is edited by the user/owner of the sensor apparatus (110) so that he/she can e.g. self-configure the action message to his/her liking.

The wireless communication network may comprise at least one of a wireless local area network (WLAN) and a mobile telephone network. Accordingly, the connection 151 in FIG. 1 comprises a wireless communication connection. The mobile telephone network may comprise e.g. a 2G, a 3G or a 4G mobile telephone network. The connections 152-157 may comprise e.g. wired or wireless Internet connections. The connection 158 may comprise e.g. a mobile telephone connection. However, it is to be understood that these connection types are merely examples, and other communication connection types may additionally/alternatively be utilized.

Figure 2:
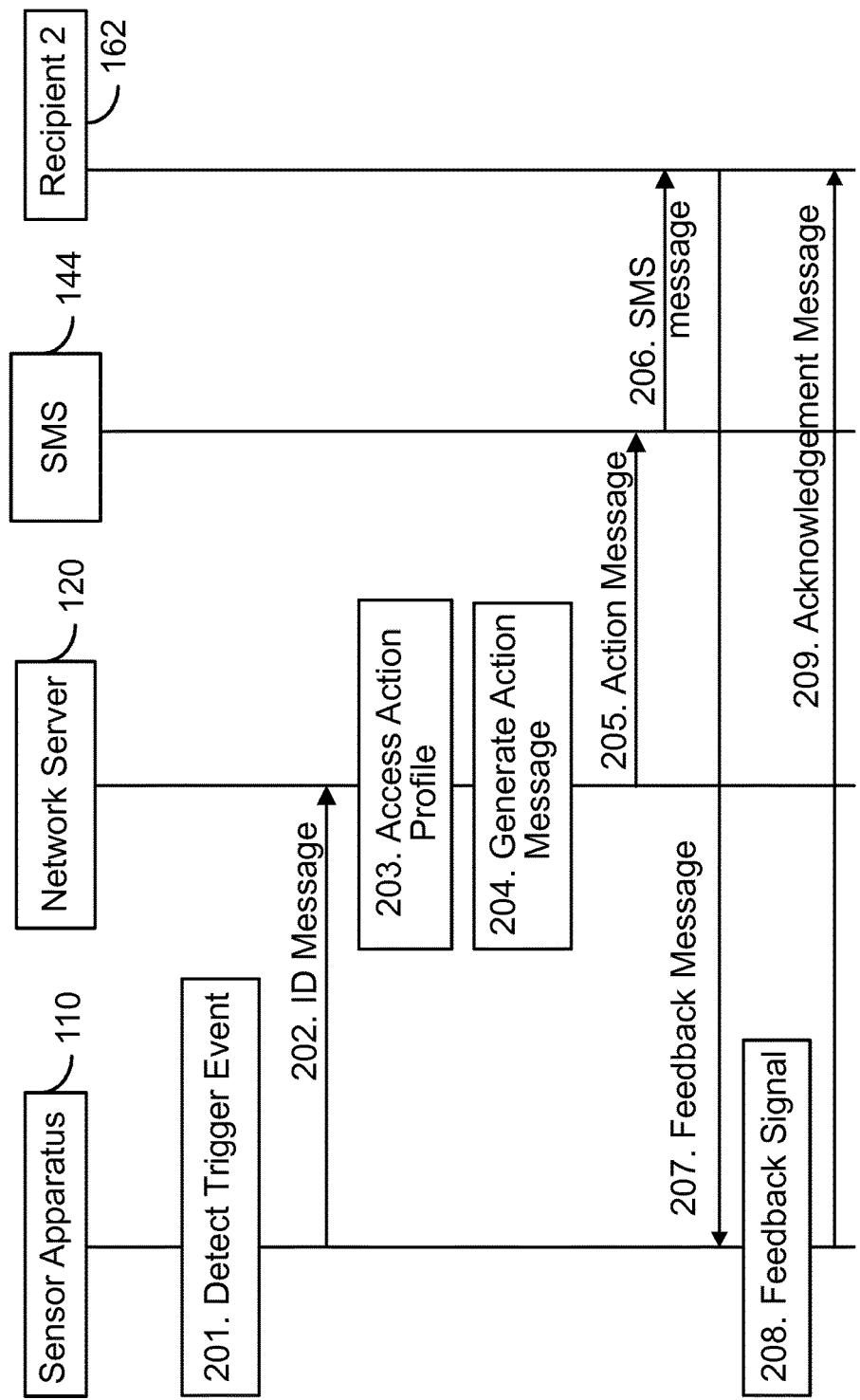
FIG. 2 is a signaling diagram illustrating a method according to an embodiment of the present disclosure.

FIG. 2 is a signaling diagram illustrating a method according to an embodiment of the present invention. In this embodiment, the response action comprises generating an action message based on information in the accessed action profile, and sending the generated action message to a network node based on the information in the accessed action profile. However, the response action is not limited to this. For example, as discussed above, the response action may additionally/alternatively comprise a database transaction. In the embodiment of FIG. 2, the action message comprises an SMS message, but as discussed above, the invention is not restricted to SMS messages.

At step 201, the sensor apparatus 110 is paired to a subscriber account before first use. The pairing may comprise entering a unique device code associated with the sensor apparatus 110 to subscriber account associated data. The unique device code may comprise e.g. an international mobile station equipment identity (IMEI) code and/or a media access control (MAC) address assigned to the wireless transmitter 112. The unique device code may be printed on a suitable location on the surface of the sensor apparatus 110. The pairing may further comprise entering to subscriber account associated data a description of a light signal sequence displayed by the sensor apparatus 110. The light signal sequence may comprise e.g. a sequence of light signals of various colors, such as a red light signal, a green light signal, a green light signal, a yellow light signal, and a red light signal. In such a case, the description to be entered would comprise "red, green, green, yellow, red". The unique device code and/or the description of the light signal sequence may be entered e.g. by an owner/licensee of the sensor apparatus e.g. via a world wide web interface using e.g. a desktop computer, a laptop computer, a tablet computer, a smart phone, or the like. The subscriber account may be associated with the action profile accessed in step 204.

The above described pairing ensures that the person entering the unique device code actually has the sensor apparatus 110 in his/her possession.

A trigger event is sensed by the sensor device 111 comprised in the sensor apparatus 110, step 202. In response, the identification message is sent from the sensor apparatus 110 over the wireless communication network, step 203. As discussed above, the identification message consists of a unique identifier of the sensor apparatus 110. The identification message is received at a network server 120, and a pre-configured action profile associated with the unique identifier in the received identification message is accessed by the network server 120, step 204. An action message is generated by the network server 120 based on information in the accessed action profile, step 205. The generated action message is sent to the network node 144 based on the information in the accessed action profile, step 206. The generated action message is received at the network node 144, and in case a request is included in the received action message, the network node 144 complies with the request. In the example of FIG. 2, the network node 144 sends an SMS message to the recipient 162, step 207. As discussed above, the contents and the recipient address (e.g. a telephone number in this case) of the SMS message have been pre-configured by editing the action profile.

The exemplary embodiments can include, for example, any suitable servers, workstations, PCs, laptop computers, other devices, and the like, capable of performing the processes of the exemplary embodiments. The devices and subsystems of the exemplary embodiments can communicate with each other using any suitable protocol and can be implemented using one or more programmed computer systems or devices.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer can read.

While the aspects of the present disclosure have been described in connection with a number of exemplary embodiments, and implementations, the aspects of the present disclosure are not so limited, but rather cover various modifications, and equivalent arrangements, which fall within the purview of prospective claims.

What is claimed is:

1. A system, comprising:
a sensor apparatus comprising a sensor device configured to sense a trigger event related to at least one of touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, and motion in proximity of the sensor apparatus, and configured to send an identification message over a wireless communication network in response to a single sensed trigger event automatically without requiring further user interaction, the identification message only consisting of a unique identifier of the sensor apparatus; and
a network server, configured to receive the identification message, access a pre-configured action profile associated with the unique identifier in the received identification message, and cause a response action to be executed based on information in the accessed action profile,
wherein the sensor apparatus is further configured to be paired to a subscriber account before first use; and
wherein the pairing comprises entering to subscriber account associated data a unique device code associated with the sensor apparatus and a description of a light signal sequence displayed by the sensor apparatus.

2. The system according to claim 1, wherein the response action comprises a database transaction.

3. The system according to claim 1, wherein the response action comprises generating an action message based on information in the accessed action profile, and sending the generated action message to a network node based on the information in the accessed action profile.

4. The system according to claim 1, wherein the sensor apparatus comprises a button, and the trigger event consists of pressing the button.

5. The system according to claim 3, wherein the information in the action profile comprises recipient data, content of the action message, and a type of the action message.

6. A method, comprising:
sending, from a sensor apparatus comprising a sensor device configured to sense a trigger event related to at least one of touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, and motion in proximity of the sensor apparatus, an identification message over a wireless communication network in response to a single sensed trigger event automatically without requiring further user interaction, the identification message only consisting of a unique identifier of the sensor apparatus;
receiving the identification message at a network server;
accessing, by the network server, a pre-configured action profile associated with the unique identifier in the received identification message; and causing, by the network server, a response action to be executed based on information in the accessed action profile, wherein the method further comprises pairing the sensor apparatus to a subscriber account before first use; and wherein the pairing comprises entering to subscriber account associated data a unique device code associated with the sensor apparatus and a description of a light signal sequence displayed by the sensor apparatus.

7. The method according to claim 6, wherein the response action comprises a database transaction.

8. The method according to claim 6, wherein the response action comprises generating an action message based on information in the accessed action profile, and sending the generated action message to a network node based on the information in the accessed action profile.

9. The method according to claim 6, wherein the sensor apparatus comprises a button, and the trigger event consists of pressing the button.

10. The method according to claim 8, wherein the information in the action profile comprises recipient data, content of the action message, and a type of the action message.

11. A sensor apparatus, comprising:

a sensor device configured to sense a trigger event related to at least one of touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, and motion in proximity of the sensor apparatus; and a wireless transmitter configured to send an identification message over a wireless communication network to a network server in response to a single sensed trigger event automatically without requiring further user interaction, the identification message only consisting of a unique identifier of the sensor apparatus, wherein the sensor apparatus is further configured to be paired to a subscriber account before first use; and wherein the pairing comprises entering to subscriber account associated data a unique device code associated with the sensor apparatus and a description of a light signal sequence displayed by the sensor apparatus.

12. A system, comprising:

a sensor apparatus comprising a button and a switch arrangement configured to sense pressing of said button, said sensor apparatus configured to interact with an Internet service via single a button press by automatically sending an identification message over a wireless communication network in response to a single sensed pressing of said button without requiring further user interaction, said identification message consisting of a unique identifier of the sensor apparatus; and a network server, configured to receive the identification message, access a pre-configured action profile associated with the unique identifier in the received identification message, and cause a response action to be executed based on information in the accessed action profile, wherein the sensor apparatus is further configured to be paired to a subscriber account before first use; and wherein the pairing comprises entering to subscriber account associated data a unique device code associated with the sensor apparatus and a description of a light signal sequence displayed by the sensor apparatus.

* * * * *